United States Patent Office 3,388,619
Patented June 18, 1968

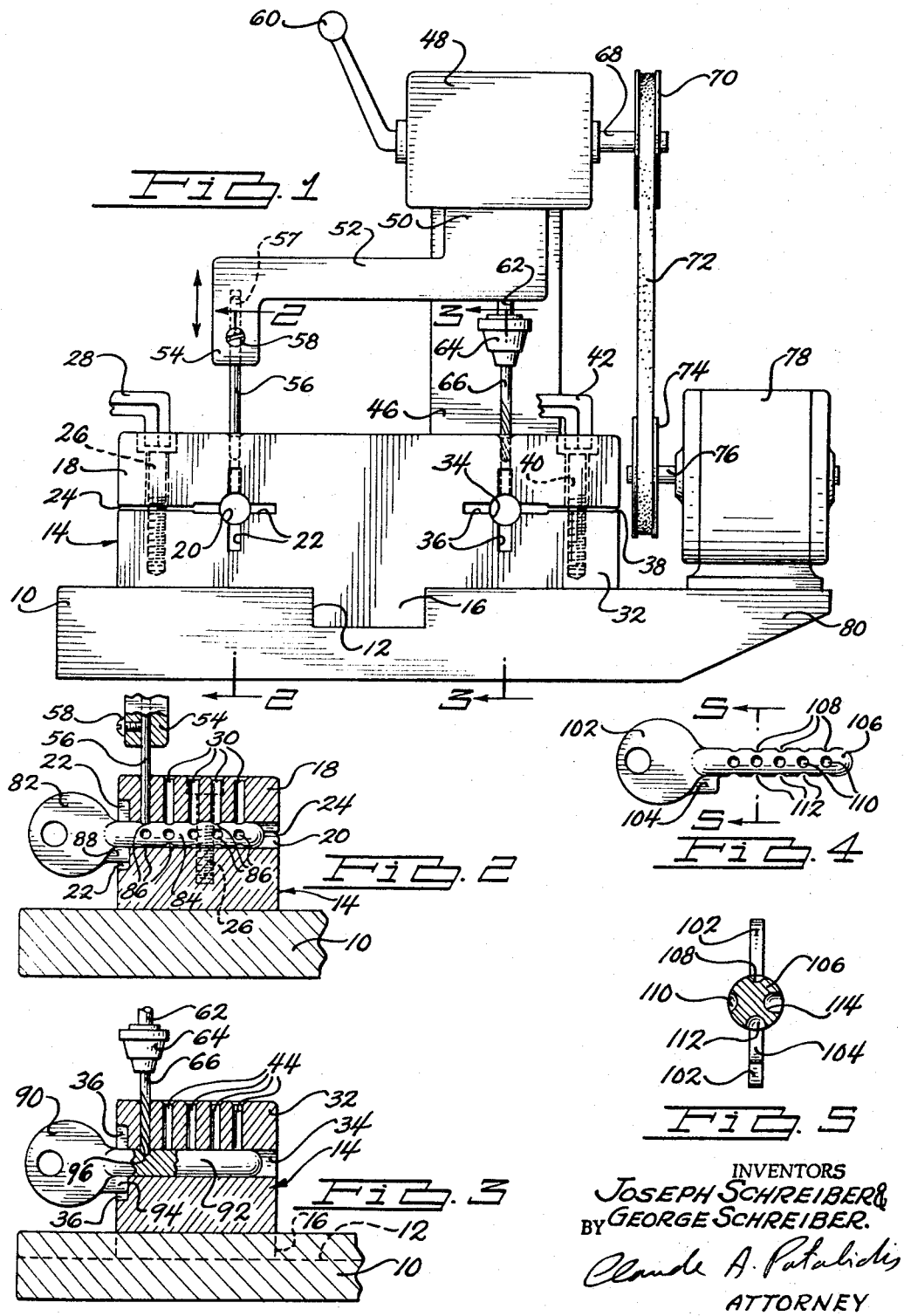

3,388,619
METHOD FOR CUTTING KEYS
Joseph Schreiber, 18507 Forrer, and George Schreiber, 18493 Winthrop, both of Detroit, Mich. 48235, assignors of ninety percent to said Joseph Schreiber and ten percent to said George Schreiber
Continuation of application Ser. No. 447,781, Apr. 13, 1965, now Patent No. 3,276,328, dated Oct. 4, 1966. This application June 30, 1966, Ser. No. 561,875
5 Claims. (Cl. 76—110)

The present application is a continuation of application Ser. No. 447,781, filed Apr. 13, 1965, and now Patent No. 3,276,328.

The invention relates in general to a method for cutting keys and more particularly to a method for duplicating keys or for making keys according to a predetermined code combination.

Though the invention has particular utility for manufacturing or duplicating keys for use in combination with locks such as are disclosed in United States Patent No. 3,167,943, issued Feb. 2, 1965 to the applicants, it should be appreciated, however, that the principles of the invention are applicable to any other key configuration. A key for use in such locks as disclosed in the patent has a cylindrical shank provided with shallow substantially concave depressions, several such depressions being generally but not necessarily disposed in a row, and several rows of depressions being angularly disposed around the periphery of the key shank. The shallow depressions are of varied depths according to the code combination of the lock for which the key is "cut."

An object of the invention is thus to provide a method for manufacturing keys having a cylindrical shank provided with shallow concave depressions according to a predetermined code combination.

Another object of the invention is to provide a method for duplicating an already existing key.

A further object of the invention is to provide a method for "cutting" keys according to a predetermined code combination.

Other objects and advantages of the invention will become apparent from the following description when it is read in conjunction with the drawings in which:

FIG. 1 is a schematic elevational view of an example of a key cutting machine for practicing the method of the present invention;

FIG. 2 is a partial cross-sectional view from lines 2—2 of FIG. 1, with a key in the process of being duplicated being held in position in the key cutting machine;

FIG. 3 is a partial cross-sectional view along lines 3—3, with a key blank being held in position;

FIG. 4 is an elevational view of a master which can be used for cutting new keys; and FIG. 5 is a cross-sectional view along line 5—5 of FIG. 4.

Referring now to the drawings and more particularly to FIGS. 1–3 which represent an example of a key cutting machine for practicing a key cutting operation according to the present invention, such illustrated example consists of a table 10 provided with a slot or rectilinear groove 12. A slide, designed generally by reference numeral 14, has a rectilinear land 16 adapted to engage the slot or groove 12 for guidance thereby. The slide 14 is movable back and forth in relation to the table 10 in one direction only as determined by the orientation of the slot or groove 12.

A master holding fixture 18 is mounted on the slide 14, or is made integral therewith as shown in the drawings. The master holding fixture 18 is provided with a cylindrical bore 20 whose axis is aligned with the direction of permissible motion of the slide 14. Radially disposed index slots 22 are provided on one end of the cylindrical bore 20 and a slit 24 extends all the way to the cylindrical bore 20 on one side thereof so as to define two bifurcated portions which may be drawn together by means of a clamp bolt 26 in the head of which a wrench 28, or the like, may be introduced. A row of guide holes 30 (FIG. 2) is disposed radially to the cylindrical bore 20 between the cylindrical bore and the upper surface, as seen in the drawings, of the master holding fixture 18.

A key blank holding fixture 32 is similarly disposed attached to on integral with, the slide 14, and is also provided with a cylindrical bore 34 having its axis parallel to the axis of the cylindrical bore 20 of the master holding fixture. The key blank holding fixture 32 has also one side bifurcated by means of a slit 34, the bifurcated portions being capable of being drawn together by way of a clamp bolt 40 driven by means such as wrench 42. A row of guide holes 44, spaced similarly to the guide holes 30 of the master holding fixture, are disposed between the cylindrical bore 34 and the top surface, as seen in the drawings, of the key blank holding fixture 32.

A column 46 is fixedly attached to the table 10 and supports a housing 48 slidably holding a quill 50. The quill 50 is provided with a horizontally extending arm 52, as shown in FIG. 1, on the end of which is provided a downwardly extending support member 54. A stop or plunger 56 is adjustably mounted in a vertical bore 57 in the support member 54, and a set screw 58 is used to hold the plunger with its end protruding a predetermined distance from the support member 54.

A lever 60 is adapted to displace, by conventional means, the quill 50 in a direction perpendicular to the table 10. A spindle 62 is journalled in the quill 50 and a chuck 64 which is mounted on the end of the spindle 62 grips a cutting tool such as a drill 66, or the like, the cutting end of which is normally set level with the end of the plunger 68 which is rotated by a pulley 70 driven in turn by a belt 72. The belt 72 is wound around a second pulley 74 which is driven by a motor shaft 76 of a motor 78 mounted on a bracket 80 attached to the table 10.

A key 82, which is to be duplicated, is mounted on the master holding fixture 18 with its cylindrical shank 84 introduced in the bore 20 (FIG. 2). The shank 84 is provided with several depressions 86 of various depths according to the code combination used for originally cutting the key. In the example of key shown, the depressions are arranged in four rows which are angularly disposed at 90° intervals around the periphery of the shank. The key 82 is provided with a tab 88 which is normally introduced in one of the index slots 22 of the master holding fixture 18. The key is clamped in the appropriate position by means of the clamp bolt 26. A key blank 90, best seen in FIG. 3, is clamped in a similar manner in the bore 34 of the key blank holding fixture 32, with its tab 94 engaging the appropriate index slot 36.

The motor 78 is started, causing the drill 66 to rotate. The slide 14 is indexed so as to present the plunger 56 above the first hole 30, i.e., the leftmost hole as seen in FIG. 2, of the master holding fixture 18. By means of the lever 60 the quill 50 is advanced and the plunger 56 and the drill 662 are simultaneously fed respectively through the first hole 30 of the master holding fixture 18 and the first hole 44 of the key blank holding fixture 32, i.e., the leftmost holes as seen in FIGS. 2 and 3, until the end of the plunger 56 abuts against the bottom surface of the first depression 86 in the shank of the key 82. The drill 66 is thus caused to cut a depression 96 in the key blank 90 corresponding in depth to the depth of the first depression 86 in the key 82.

The slide 14 is subsequently indexed for each consecutive depression in one row, and both the key 82 and the key blank 90 are subsequently angularly indexed to the next angular positions to cut consecutive rows of depressions on the shank 92.

It can thus be seen that, in this manner, any key may be duplicated with accuracy and rapidity.

In order to cut a new key according to a predetermined code, a similar machine may be used with a master 102 (FIGS. 4-5) inserted in the master holding fixture 18. The master 102 is provided with a tab 104 and a cylindrical shank 106. The shank 106 has a first row of shallow depressions 108, a second row of shallow depressions 110 having, for example, twice the depth of the depressions 108, a third row of shallow depressions 112 having a depth which is three times the depth of the depressions 108 and a fourth row of shallow depressions 114 which have four times the depth of the depressions 108. The rows of depressions 108, 110, 112 and 114 are respectively disposed at 90° from each other. The first row represents code number 1, while the second row represents code number 2, while the third row represents code number 3 and the fourth row represents code number 4.

If it is desired to cut a key having a code number 14320 relatively to its first row of depressions, the master 102 is placed in the bore 20 of the master holding fixture 18, and the tab 104 is disposed in the appropriate slot 22 to present the row of depressions 108 to the plunger 56 when the plunger 56 is indexed with and introduced through the first hole 30, this being the position shown in FIG. 2. The drill 66 is then caused to cut a depression in the shank 92 of the key blank 90 corresponding to the depth of the depressions 108. The next depression in the key blank shank 92 is cut with the master 102 indexed so as to present the row of depressions 114 to the plunger 56, and the two following depressions are cut in the key blank shank 92 after rotating and indexing the master 102 so as to present consecutively the rows of depressions 114, 112 and 110 to the plunger 56. No depression is cut corresponding to the last depression position, i.e., corresponding to the plunger 56 and the drill 66 being introduced respectively through the rightmost holes 30 and 44, in order to obtain code number 0. Successive rows of depressions may be cut, if so desired, on the key blank shank 92 by angularly indexing the key blank 90 for successive rows by means of the tab 94 being presented to the appropriate index slots 36.

It can thus be seen that the invention provides a method for cutting new keys according to a predetermined code as well as for duplicating an already made key.

It is obvious that the foregoing description of the invention is only for the purpose of explaining the principles of the invention and that various structures and combinations of elements may be used by persons skilled in the art for accomplishing the teachings of the invention without departing from the spirit and scope of the invention as defined by the appended claims.

We claim:
1. A method for cutting keys having a shank provided with depressions whose depths vary according to a predetermined code, said method comprising:
   holding a key blank in a predetermined angular position;
   rectilinearly indexing the shank of said key blank with respect to a cutting means so as to cut spaced depressions on said shank at predetermined distances from each other;
   angularly indexing said shank so as to cut said depressions at various angular positions;
   and limiting the depth of cut of each individual depression according to said predetermined code.

2. The method of claim 1 wherein said shank is angularly indexed after a plurality of rectilinearly aligned depressions have been cut in said shank in a row so as to cut another row of rectilinearly aligned depressions at a predetermined angular position with respect to said first mentioned row of rectilinearly aligned depressions.

3. A method for cutting keys having a shank provided with depressions whose depths vary according to a predetermined code, said method comprising:
   holding a master provided with spaced depressions and a key blank with their axes in substantial parallel relationship and at a predetermined angular position;
   advancing a cutting tool mounted on a spindle having an axis of rotation substantially perpendicular to the longitudinal axis of the shank of said key blank into said shank;
   advancing a plunger having its longitudinal axis substantially perpendicular to the longitudinal axis of said master and capable of advance toward said master simultaneously with the advance of said rotating cutting tool into said shank so as to limit said advance of said tool into the shank of said key blank to a predetermined depth as defined by the depth of the corresponding depression on said master;
   simultaneously longitudinally indexing said master and said blank for defining the longitudinal position of each depression cut on the shank of said key blank with respect to a depression on said master;
   and simultaneously angularly indexing said master and said blank for defining the angular position of each depression cut on the shank of said key blank with respect to the angular position of a depression on said master.

4. The method of claim 3 wherein said master is a key sought to be duplicated on said key blank.

5. The method of claim 3 wherein the master has a shank provided with angularly arranged consecutive depressions of depths in a progression according to said predetermined code.

References Cited
UNITED STATES PATENTS

| | | | |
|---|---|---|---|
| 1,978,009 | 10/1934 | Caron | 90—13.05 |
| 2,129,087 | 9/1938 | George et al. | 90—13.05 |
| 3,148,589 | 9/1964 | Le Fever | 90—13.05 |
| 3,276,328 | 10/1966 | Schreiber et al. | 90—13.05 |

GERALD A. DOST, *Primary Examiner.*